Jan. 3, 1956 C. H. CROOKS 2,728,944

PRODUCTION OF ARTIFICIAL FILMS

Filed Jan. 19, 1953

INVENTOR:

Charles Hampden Crooks,

BY Cushman, Darby & Cushman

ATTORNEYS.

United States Patent Office 2,728,944

Patented Jan. 3, 1956

2,728,944

PRODUCTION OF ARTIFICIAL FILMS

Charles Hampden Crooks, Welwyn, England, assignor to Imperial Chemical Industries Limited, London, England, a corporation of Great Britain Application January 19, 1953, Serial No. 331,905

Claims priority, application Great Britain August 1, 1952

5 Claims. (Cl. 18—15)

This invention relates to the production of artificial films and more particularly to the production of films from highly polymeric synthetic linear compounds. In the term "highly polymeric synthetic linear compounds" as used throughout this specification we include the linear condensation superpolymers and particularly linear superpolyesters (including interpolyesters) obtainable from aromatic dicarboxylic acids and glycols, and linear superpolyamides (including interpolyamides), that may be made into filaments and cold-drawn to yield fibres of high tenacity. Particularly useful for film manufacture are polyethylene terephthalate, and the superpolyamides obtainable from adipic or sebacic acid and hexamethylene diamine, and that obtainable from caprolactam.

It is known in the art that films can be made from this class of materials by rapidly cooling a thin layer of the molten material. The present invention is directed to an improved method for carrying out this cooling step for extruded films.

According to this invention a process for the production of films comprises cooling a melt extruded film of a highly polymeric synthetic linear compound by passing it downwards in its molten state into a pool of liquid maintained in the nip formed between two contra-rotating rolls, the two rolls being rotated at equal peripheral speed and each roll, at the nip, rotating in the direction of travel of the film, which passes through the nip.

The pool of liquid may be maintained in the nip of the rolls in a variety of ways. In a preferred method, the nip rolls are immersed to a depth less than their diameter in a bath of the liquid, and the rotation of the rolls carries a film of the liquid round into the nip and there forms a pool; a small amount of a wetting agent may be added to the liquid to ensure that sufficient is carried into the nip. Another suitable method is that of spraying the liquid on to the rolls or on to the molten film before the film reaches the nip. If the latter method is used, care must be taken to avoid marking the film by sudden contact of the molten film with droplets of liquid. The depth of the pool of liquid formed in the nip can vary and may be as high as the radius of the rolls; it must always be sufficient to provide enough liquid to cool the film sufficiently.

Any non-volatile liquid may be used for cooling the film, provided that it does not significantly attack or react disadvantageously with the film during the cooling operation. For water-insoluble films, such as nylon and polyethylene terephthalate films, it is preferred that the liquid be water or a water-soluble liquid having a boiling point not substantially below that of water; such liquids can easily be removed from the surfaces of the film. Glycerol is a particularly suitable liquid for use with nylon or polyethylene terephthalate film, and it may if desired be used in admixture with water. For example, mixtures of glycerol with up to about 25% by weight of water are very satisfactory; these mixtures combine the advantage of having a much higher boiling point than water with that of having a lower viscosity than pure glycerol and hence a reduced tendency to be carried by the rolls from the bath to nip in such large amounts as to produce turbulence in the pool. Glycol is another water-soluble liquid suitable for use with nylon and terephthalate film, particularly if diluted with water; but care must be taken to avoid contact of the film with glycol over long periods, or some solution of the film may occur.

The temperature of the cooling liquid must be sufficiently below the melting point of the highly polymeric linear compound to cause the molten film to solidify. Because of the high melting points of the polymers used, there may be a tendency for the liquid in contact with the freshly extruded film to boil locally, particularly when the liquid is water or another liquid having a boiling point far below the melting point of the polymer. This tendency is shown particularly when the film being extruded is more than about 0.003 inch thick, or when low rates of extrusion are used. Higher extrusion rates result in greater agitation of the layers of liquid in contact with the film surfaces, and so reduce overheating of the liquid. Local boiling can take place irrespective of the depth of the pool in the nip; it causes defects such as rippling and surface streaks and blotches to appear on the film. Such boiling should therefore be avoided, if necessary by providing means for cooling the layers of liquid in contact with the film surfaces.

The liquid in the nip may be cooled close to the surface of the film by any convenient method. For example, cooling may be accomplished by means of one or more refrigerator tubes, containing a chilled, circulating liquid such as methanol, placed on each side of the film close to the surface thereof and extending across substantially the whole width of the film. Another method is that of chilling the nip rolls themselves by internal circulation of a chilled liquid such as water or methanol. Cooling may also be accomplished by the removal of hot liquid from the pool at each side of the film from the portions of the pool directly between the film and the rolls. If this method is used, it is preferred that the liquid be removed at a plurality of points spaced across the width of the film, preferably at positions as close as possible to the film; or that it be removed from a continuous area extending substantially across the width of the film in a position as close as possible to the film. The liquid may be removed by means of suction tubes.

It is to be understood that liquid is supplied to the nip at a rate sufficiently high to maintain a pool therein, preferably a pool of substantially constant depth. Except when liquid is drawn, for cooling purposes, sufficiently quickly from the pool in the regions directly between the film and the rollers, the liquid is allowed to flow from the ends of the nip at a rate controlled so as to give a pool of substantially constant depth in the nip. Even when some liquid is removed for local cooling purposes, such an arrangement is usually of advantage because it generally allows the liquid in the pool to be kept at a temperature lower than would be possible in the absence of any outflow at the ends of the nip. In the absence of means for withdrawing the liquid from points between the film and the rolls, the whole of the outflow of liquid will, of course, be from the two ends of the nip. The rate of outflow may be controlled, for example, by means of plates placed across the ends of the nip, the space between the ends of the rolls and the plates being adjustable.

The bulk of the liquid, in the bath, is preferably maintained at a temperature as low as possible by any convenient method. When the liquid is water, a sufficiently low temperature can usually be maintained by allowing mains water to flow in at one end of the bath and out at the opposite end. When other liquids are used they may be suitably chilled, for example, by means of cooling coils immersed in the bath or by circulating the liquid from the bath through a refrigerating system and back to the bath.

The radius of the nip rolls may vary within wide limits; it is necessary only that the radius be such as to allow an adequate amount of liquid to be carried into the nip, but not so much as to cause turbulence in the pool. In general, the optimum radius increases with the speed at which the film is to be drawn from the extrusion orifice, that is, with the peripheral speed of the rolls; it also increases with the viscosity of the liquid. It is usually most convenient to use rolls of radius not exceeding 9 inches, since a greater radius will usually make it difficult for the extrusion die 11 to be brought sufficiently close to the nip. When the rolls are partly immersed in the liquid and are to be rotated at very high speeds, it is preferred that they be immersed to a depth not greater than three-quarters of their diameter; this precaution prevents the liquid from being carried over to the nip in amounts large enough to cause ripples on the surface of the pool. Other conditions being unchanged, the optimum depth of immersion of the rolls decreases with increasing viscosity of the liquid used. It will be appreciated that this optimum depth is the greatest depth to which the rolls can be immersed (and hence the depth giving the most rapid rate of supply of the liquid) without causing sufficient turbulence to affect disadvantageously the surface characteristics of the film.

In accordance with a further feature of the present invention, apparatus for operating the process hereinbefore described comprises a pair of contra-rotatable nip rolls, means for extruding a molten film downwards into the nip of the rolls, means for supplying liquid to the nip and maintaining a pool of liquid therein, and means for adjusting the rate of outflow of liquid from the pool at the ends of the nip. The apparatus may include means for cooling the liquid at each side of the path of the film.

A modification of this apparatus, designed for use under conditions in which local overheating of the liquid in the nip is particularly likely to occur, comprises a pair of contra-rotatable nip rolls, means for extruding a molten film downwards into the nip of the rolls, means for supplying liquid to the nip and maintaining a pool of liquid therein, and means for removing liquid from the pool at each side of the path of the film and in the regions directly between the path of the film and the nip rolls. It is preferred that the said means for removing liquid are adapted to operate at a plurality of points spaced across the width of the film, or to operate over continuous areas extending substantially across the width of the film; it is also preferred that the means be placed as close as possible to the film without actually touching it or causing it to be sucked against them as the liquid is removed. Means for adjusting the rate of outflow of liquid at the ends of the nip rolls may be included.

Reference will now be made to the accompanying drawings which illustrate diagrammatically, and by way of example, an apparatus constructed in accordance with the invention, and designed for use with water as the cooling liquid.

Figure 1:
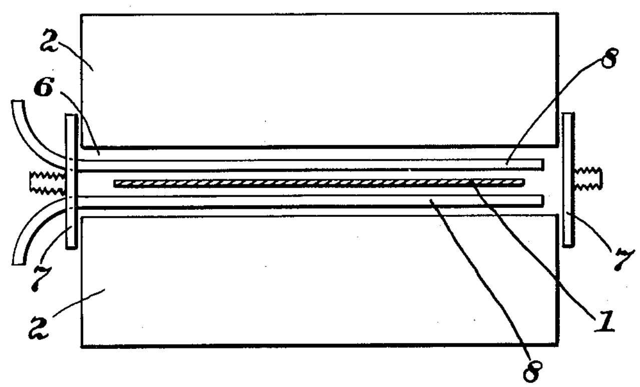
Figure 1 is a plan view of such apparatus.
Figure 2:
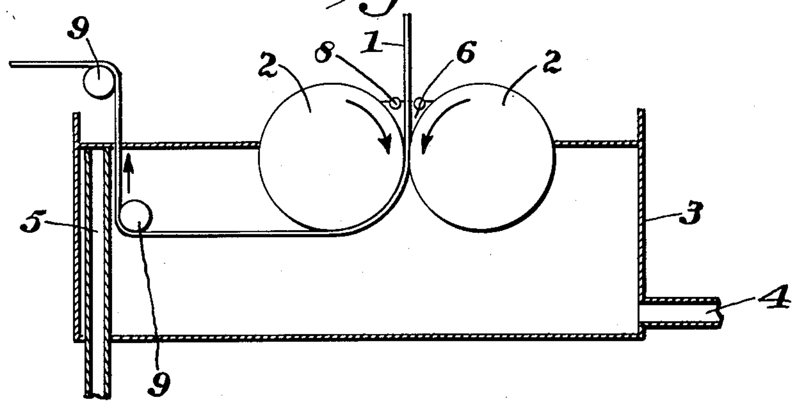
Figures 2 and 3 show two forms of the apparatus in vertical section.
Figure 3:
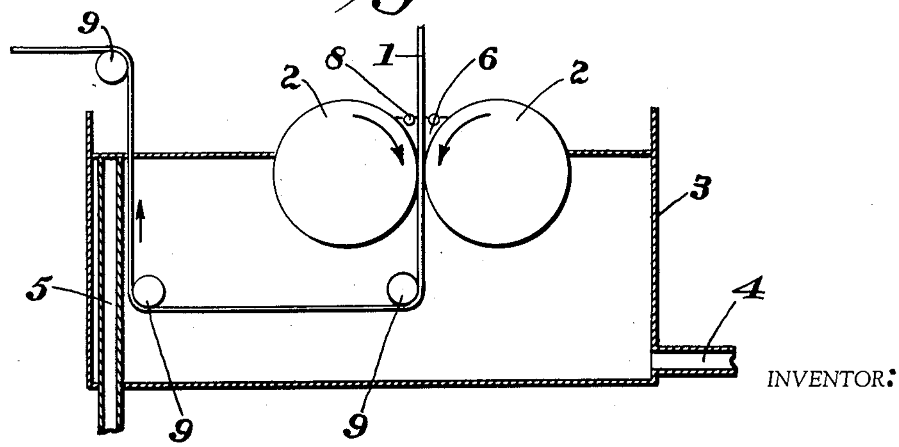

In these drawings, 1 is a freshly extruded, molten film which passes to the nip of steel rollers 2 which are immersed to a depth of about two-thirds of their diameter in water contained in a bath 3. Cold water is supplied to this bath at the inlet 4 and flows out at the adjustable overflow 5. Water is carried over on the surface of the rotating rolls and this raises the level of the water in the pool 6 above that of the water in the bath; this level is maintained by the end plates 7 at each end of the nip. A suction tube 8 is provided on each side of the film in a position close to the film; this tube is provided with a series of holes facing downwards and slightly towards the film surface, through which water is drawn away from the region of the film surface. Each tube is preferably placed so that the holes lie on a diameter of the tube that makes an angle of not more than 45° with the vertical. The end plates are adjusted to allow excess water to flow from each end of the nip at such a rate that the level of the pool 6 remains substantially constant. Idler rolls 9 are provided round which the film travels through and out of the bath to the wind-up roller.

Many modifications of the apparatus particularly described may be constructed in accordance with the present invention. For example, the tubes 8 may be provided with a continuous slit instead of a series of holes for withdrawing water from the region of the surface of the film; a series of open ended suction tubes may be used, spaced across the width of the film with their open ends close to the film surface; or, as stated hereinbefore, the water in the pool may be cooled by means of refrigerator tubes or by the nip rolls themselves, instead of by removal of water through the suction tubes. Other methods may be used to supply water to the nip of the rollers. Moreover, if the speed of operating the process is sufficiently great, the passage of the film through the liquid will agitate the layers of water in contact with the film surfaces to such an extent that local boiling will thereby be prevented; the suction tubes used to withdraw water from the pool, or other cooling means for the pool, may then be omitted. When a liquid other than water is used, it will generally be desirable to provide means for cooling and conserving the liquid in the bath; this may be done, for example, by circulating the liquid through a refrigerating system, or by immersing cooling coils in the bath itself. When a liquid having a higher boiling point than water is used, the use of suction tubes or other means for locally cooling the pool of liquid in the nip is in most cases unnecessary.

After passing between the nip rolls the film, which is now solidified to a greater or lesser degree, may be passed round one of the rolls and led directly to a further processing step, or may be reeled directly. It may be desirable, particularly if the film is thick, to pass it through a bath of liquid, to ensure complete and thorough cooling, before it is further processed or reeled.

The advantages obtained by passing the molten film of highly polymeric synthetic linear compound into the pool between two nip rolls rather than directly into a bath of the cooling liquid are mainly concerned with the quality of film produced. If the molten film is passed directly into a cooling bath, which must of necessity have a fairly large surface area, any ripples and disturbances which may be set up on the surface of the bath will cause the molten film to wobble instead of following a straight path from the extruder to the nip, and this will give rise to irregular thickness and surface defects in the film. Although these defects may not always be visible to the naked eye before the film is subjected to further treatment, e. g. stretching treatments, the final film produced will be found to be of uneven quality. Using the process of the present invention there is produced film of high surface quality, of regular thickness and of very uniform appearance.

The process of the present invention is used with particular advantage in the production of films from materials that are highly mobile when in the molten state and give relatively stiff films when solidified. Such films are most likely to be adversely affected by ripples and other disturbances in the cooling water and particularly by local boiling of the water. The process is of particular value for use in the production of film from polyethylene terephthalate. This material forms stiff films from a highly mobile melt, and the film has exceptionally high clarity and surface lustre; but the latter properties can very easily be spoiled unless the film is quenched under carefully controlled conditions.

Our invention is illustrated but not limited by the following examples.

*Example 1*

Highly polymeric polyethylene terephthalate was melted and extruded through a slot orifice 8 inches long and 0.015 inch wide. The molten film was passed vertically through a 2 inch air gap to the surface of a pool of water contained in the nip of the pair of rolls in apparatus as shown in the accompanying drawings. The film then passed between the two suction tubes to the nip of the rolls. These suction tubes were 8 inches long, 26 gauge brass tubes of 3/16 inch outside diameter; each was drilled with 11 holes 0.04 inch in diameter, equally spaced, facing downwards but inclined towards the film surface at an angle of 20° to the vertical. The two tubes were connected to separate water pumps for the rapid removal of hot water from the vicinity of the film surfaces. The film passed to the nip of the rolls, which were polished chromium plated rolls 4 inches in diameter, immersed in the water to a depth of two-thirds of their diameter, and rotated at a peripheral speed of 30 ft./minute. The film which had solidified before it reached the nip of the rolls, was passed round one of the nip rolls and round the two idler rolls to the wind-up reel.

The level of the pool of liquid in the nip was maintained at a depth of 1 inch by adjustment of the end plates in accordance with the rate at which water was carried into the nip on the surface of the rolls, and the rate of removal by the suction tube. The rate of extruding the film was so adjusted to the haul off speed that the film was drawn down to a final thickness of 0.008 inch.

The film so produced was of excellent quality, being of high clarity and lustre and free from surface blemishes.

*Example 2*

Film of highly polymeric polyethylene terephthalate was extruded and quenched by a method identical with that of Example 1, except that the suction tubes were replaced by two 8 inch long 26 gauge brass tubes, of 3/16 inch outside diameter, which were connected in parallel to a circulating supply of methanol at a temperature of −20° C. To avoid freezing the water in the nip, this methanol was circulated through the tubes only while the nip rolls were rotating. The end plates were placed slightly further from the ends of the nip than in Example 1, to maintain the pool of water in the nip at the same depth of 1 inch.

Film of excellent quality, free from surface blemishes, was produced.

*Example 3*

Using the same apparatus as in Example 1 but omitting the suction tubes or any other means of cooling the water in the nip, film of highly polymeric polyethylene terephthalate was made at a speed of 30 ft./minute, with the rate of extrusion and the width of the slot orifice adjusted to give a film thickness of 0.004 inch. This film showed surface defects caused by local boiling of the water.

The peripheral speed of the nip rolls was then increased to 70 ft./minute, the output of the extruder was correspondingly increased to give film of the same thickness, 0.004 inch, and the end plates were adjusted to maintain the pool of water in the nip at the same depth of 1 inch. This film produced under these conditions was of excellent quality and showed no signs of boil marks; the rate of entry of the melt into the water had been fast enough to circulate the water in the nip sufficiently to prevent local boiling.

*Example 4*

In the apparatus and method described in Example 1, the water in the bath was replaced by a mixture of 80% glycerol with 20% of water. This mixture in the bath was maintained at a temperature of 40° C. by pumping it from one end of the bath and returning it to the other by way of cooling coils. The suction tubes or other means of cooling the liquid in the nip were omitted; the nip rolls were immersed to a depth only 1/4 of their diameter, and the end plates were moved to a distance of 1/2 inch from the ends of the nip. Film 0.008 inch thick, of polyethylene terephthalate, was made by this method at speeds of from 20 to 100 ft./minute without any surface defects being produced. The film was in every case of excellent quality.

*Example 5*

For purposes of comparison, in the apparatus and method described in Example 1 the nip rolls were immersed in the water to a depth 1/16 inch greater than their diameter, so that the water surface broken by the melt in entering the bath extended across the whole width of the bath. The nip rolls were rotated at a peripheral speed of 30 ft./minute, and the output of the extruder was adjusted to give film 0.008 inch thick. It was found that ripples on the surface of the bath, which were inevitably produced in operating the process, deflected the molten film from its path and resulted in the formation of corrugations as the film solidified. The corrugated film, in emerging from the bath, set up more ripples on the surface of the water, and these travelled across the bath to form further corrugations on the newly extruded film. A process was thus established in which there was produced film having substantially regular, deep corrugations. The corrugations had an amplitude of approximately 1.5 inches and a depth of approximately 0.38 inch; they rendered the film useless for any of its normal applications.

I claim:

1. Apparatus for the production of melt-extruded film which comprises a pair of contra-rotatable nip rolls, means for extruding a molten film downwards into the nip of the rolls, means for supplying liquid to the nip and for maintaining a pool of liquid therein, and means for removing liquid from the pool at each side of the path of the film said means being in the regions directly between the path of the film and the nip rolls.

2. Apparatus according to claim 1 in which said means for removing liquid are adapted to operate at a plurality of points spaced across the width of the film and close to the surfaces thereof.

3. The apparatus of claim 1, also containing means for controlling the rate of outflow of liquid from the pool at the ends of the nip.

4. The apparatus of claim 3, in which the means for controlling the rate of outflow of liquid from the pool at the end of the nip are adjustable end plates.

5. Apparatus for the production of melt-extruded film which comprises a pair of contra-rotatable nip rolls, means for extruding a molten film downwards into the nip of the rolls, means for supplying liquid to the nip and for maintaining a pool of liquid therein, and at least one refrigerator tube placed on each side of the path of the film in close proximity thereto and above the nip of the rolls, and extending across substantially the whole width of the path of the film.

References Cited in the file of this patent

UNITED STATES PATENTS

| | | |
|---|---|---|
| 2,128,941 | Hudson | Sept. 6, 1938 |
| 2,212,772 | Graves | Aug. 27, 1940 |
| 2,585,156 | Montross | Feb. 12, 1952 |
| 2,624,913 | Montross et al. | Jan. 13, 1953 |